United States Patent
Moritani

(10) Patent No.: US 7,239,354 B2
(45) Date of Patent: Jul. 3, 2007

(54) DIGITAL IMAGE DEMODULATING APPARATUS

(75) Inventor: Shuji Moritani, Osaka (JP)

(73) Assignee: Funai Electric Co., Ltd., Daito-shi, Osaka (JP)

(*) Notice: Subject to any disclaimer, the term of this patent is extended or adjusted under 35 U.S.C. 154(b) by 543 days.

(21) Appl. No.: 10/447,080

(22) Filed: May 28, 2003

(65) Prior Publication Data
US 2004/0008276 A1    Jan. 15, 2004

(30) Foreign Application Priority Data
May 28, 2002   (JP) .................. P. 2002-154362

(51) Int. Cl.
  *H04N 7/01* (2006.01)
  *H04N 11/20* (2006.01)
(52) U.S. Cl. .............. 348/445; 348/556; 348/441; 348/913
(58) Field of Classification Search .......... 348/556, 348/555, 445, 441, 913, 558, 747; H04N 7/01, H04N 11/20
See application file for complete search history.

(56) References Cited
U.S. PATENT DOCUMENTS

| | | | | |
|---|---|---|---|---|
| 5,218,436 A | * | 6/1993 | Sugiyama et al. | ........... 348/445 |
| 5,291,295 A | * | 3/1994 | Srivastava | ................. 348/805 |
| 5,323,235 A | * | 6/1994 | Tonomura et al. | .......... 348/445 |
| 5,343,238 A | * | 8/1994 | Takata et al. | ............... 348/556 |
| 6,229,574 B1 | * | 5/2001 | Han | .......................... 348/555 |
| 6,366,706 B1 | * | 4/2002 | Weitbruch | .................. 382/254 |
| 6,462,783 B1 | * | 10/2002 | Okayama et al. | ........... 348/556 |

FOREIGN PATENT DOCUMENTS

| JP | A-9-326974 | 12/1997 |
|---|---|---|
| JP | A-10-150614 | 6/1998 |

* cited by examiner

*Primary Examiner*—Trang Tran
(74) *Attorney, Agent, or Firm*—Osha Liang LLP

(57) ABSTRACT

A ratio between an aspect ratio of a digital image signal and an aspect ratio of a display device is converted and a presence image part 2 of digital image data decoded by a digital image signal demodulating part is compressed laterally and is shifted to the center of an image area 1 made of the aspect ratio of the digital image signal and then an absence image part 3 is used as side panels 4 and digital image data made of the aspect ratio of the digital image signal is formed and outputted. Thus, even when the display device converts an image by a lateral uniform expansion method, a display image without lateral expansion can be outputted on a display screen.

6 Claims, 4 Drawing Sheets

DIGITAL IMAGE DEMODULATING APPARATUS

BACKGROUND OF THE INVENTION

This invention relates to a digital image demodulating apparatus for outputting a digital image signal inputted to a main body to a display device such as a monitor, and particularly to a digital image demodulating apparatus for converting and outputting a digital image signal corresponding to an aspect ratio of a display device when an aspect ratio of a digital image signal inputted differs from an aspect ratio of a display image of a display device outputted.

In a screen of a display device such as a monitor or a liquid crystal display, there are plural standards in an aspect ratio which is a dimension ratio of height to width, and an image signal of DVD, video, television broadcast, etc. includes an image signal having plural specifications corresponding to these aspect ratios. For example, there are things of an aspect ratio of 4 to 3 or an aspect ratio of 16 to 9 with a wider size than this.

As a result of this, plural apparatus and methods for display with the minimum strange feeling when an aspect ratio of the image signal differs from an aspect ratio of a display screen are proposed.

Particularly, a method shown in FIGS. 4A and 4B is devised as a method for displaying an image signal with an aspect ratio of 4 to 3 on a display screen with an aspect ratio of 16 to 9.

FIGS. 4A and 4B are schematic diagrams showing a state of displaying an image signal with an aspect ratio of 4 to 3 at an aspect ratio of 16 to 9, and FIG. 4A is a diagram showing a lateral uniform expansion method and FIG. 4B is a diagram showing a side panel method.

The lateral uniform expansion method shown in FIG. 4A is a method for expanding an image frame 1 with an aspect ratio of 4 to 3 horizontally uniformly and converting the image frame into an image frame 5 with an aspect ratio of 16 to 9, but the entire presence image part 2 expands laterally, so that an image 11 displayed on a screen is deformed from an image 10 and, for example, a perfect circle of the image 10 becomes a horizontally long ellipse of the image 10 to be displayed. On the other hand, the method shown in FIG. 4B is a method for placing side panels 4 of a non-signal part in both ends of a horizontal direction of the image frame 1 with the aspect ratio of 4 to 3 and forming the image frame 5 with the aspect ratio of 16 to 9. A display screen is formed of the presence image part 2 with the substantially same shape as that of the original image and the side panels 4.

Thus, in the lateral uniform expansion method, the image is displayed on the entire screen of a display device, but the displayed image expands laterally, so that the original image shape cannot be maintained. On the other hand, in the side panel method, the image cannot be obtained on the entire screen but the original image shape can be reproduced and displayed faithfully.

Further, a digital image demodulating apparatus comprising converter according to a relation between an aspect ratio of such an original image signal and an aspect ratio of a display device is disclosed in a publication of the Unexamined Japanese Patent Application Publication No. Hei9-326974. According to this publication, image display without a strange feeling is performed by making conversion of the image signal automatically according to the aspect ratio of the original image signal and the aspect ratio of the display device. Here, an image signal with an aspect ratio of 4 to 3 is moved to the center of an area of an aspect ratio of 16 to 9 and is expanded laterally or side panels are added to both lateral ends and the image signal is converted into an image with the aspect ratio of 16 to 9.

Further, a display apparatus for displaying another image with an aspect ratio of 4 to 3 on a display screen with an aspect ratio of 16 to 9 is disclosed in a publication of the Unexamined Japanese Patent Application Publication No. Hei10-150614. According to this publication, when a display device with specifications of the aspect ratio of 16 to 9 receives an image signal with the aspect ratio of 4 to 3, non-signal parts are added to both lateral ends of the image signal and an image without a strange feeling is displayed.

In such a method of conversion and display of the image of the case that the aspect ratios differ, there was the following object to be solved.

In the conventional art described above, a display method to the display device with the aspect ratio different from that of the image signal is provided and switching of display is performed automatically by setting etc. of a user.

However, in some conventional display devices with an aspect ratio of 16 to 9, conversion is made automatically by the lateral uniform expansion method when an image signal with an aspect ratio of 4 to 3 is inputted. In this case, the original image size cannot be maintained and lateral expansion of the image occurs always and a difficult-to-view is caused.

Further, the art disclosed in the Unexamined Japanese Patent Application Publication No. Hei9-326974 must preset whether to perform lateral uniform expansion or add side panels when an image with an aspect ratio of 4 to 3 is displayed in a display device with an aspect ratio of 16 to 9. Here, in the case of being set to a lateral uniform expansion mode, an output is produced to the display device without performing image processing with respect to the image with the aspect ratio of 4 to 3 inside a digital image demodulating apparatus and the display device expands an image signal laterally uniformly. In this case, the image with the aspect ratio of 4 to 3 is directly expanded to an image with an aspect ratio of 16 to 9, so that lateral expansion of the image occurs. Further, in the case of being set to a side panel addition method, by the digital image demodulating apparatus, side panels are previously added to the image with the aspect ratio of 4 to 3 and conversion is made into an image with an aspect ratio of 16 to 9 and then an output is produced to a display device, so that the display device displays the image without performing image processing.

Further, in the Unexamined Japanese Patent Application Publication No. Hei10-150614, the art about the display device (display apparatus) is merely shown and a problem of automatic lateral uniform expansion resulting from the difference between the original image signal and the display device in the aspect ratio as described above is not considered.

SUMMARY OF THE INVENTION

An object of the invention is to provide a digital image demodulating apparatus capable of faithfully displaying an original image regardless of an aspect ratio of a digital image signal inputted to a main body.

In order to achieve the object, a digital image demodulating apparatus of the invention is characterized by comprising digital image data controller for laterally compressing a digital image based on a digital image signal with a predetermined aspect ratio inputted to a main body and adding side panels of a predetermined size to both sides of this digital image laterally compressed and forming the digital image with the predetermined aspect ratio before the lateral compression, and digital image output means for outputting the digital image formed by the digital image data controller.

In this construction, digital image data is formed based on a digital image signal inputted to a main body and control of a digital image by compression in a lateral direction and addition of side panels to both ends of the lateral direction is performed and this controlled digital image is outputted at the same aspect ratio as the aspect ratio of the original digital image signal.

In the digital image data controller, a digital image with an aspect ratio smaller than the aspect ratio of the original digital image signal is formed by laterally compressing the digital image. Next, digital image data constructed by the aspect ratio of the original digital image signal is formed by adding side panels of a predetermined size to both ends of a lateral direction of this digital image.

Further, in the digital image data controller, a digital image larger than an aspect ratio of the original digital image signal present in specifications of an aspect ratio of a display device on which an image is to be displayed is formed by adding side panels of a predetermined size to a lateral direction of the digital image. Next, this digital image is compressed so as to become the aspect ratio of the original digital image signal.

Further, a digital image demodulating apparatus of the invention is characterized by comprising aspect ratio detector for detecting an aspect ratio of a digital image signal inputted to a main body. In this construction, the digital image data controller acts when an aspect ratio of the digital image signal detected by the aspect ratio detector is the predetermined aspect ratio described above, and a digital image constructed by the aspect ratio of the digital image signal is formed.

Further, in such construction, when a digital image signal with an aspect ratio of 4 to 3 is inputted, digital image data is outputted at the aspect ratio of 4 to 3 by performing the control in the digital image demodulating apparatus.

DETAILED DESCRIPTION OF THE PREFERRED EMBODIMENTS

An embodiment of the invention will be described below with reference to the drawings.

In the embodiment, as a digital image demodulating apparatus, description will be made taking a DVD player as an example.

Figure 1:
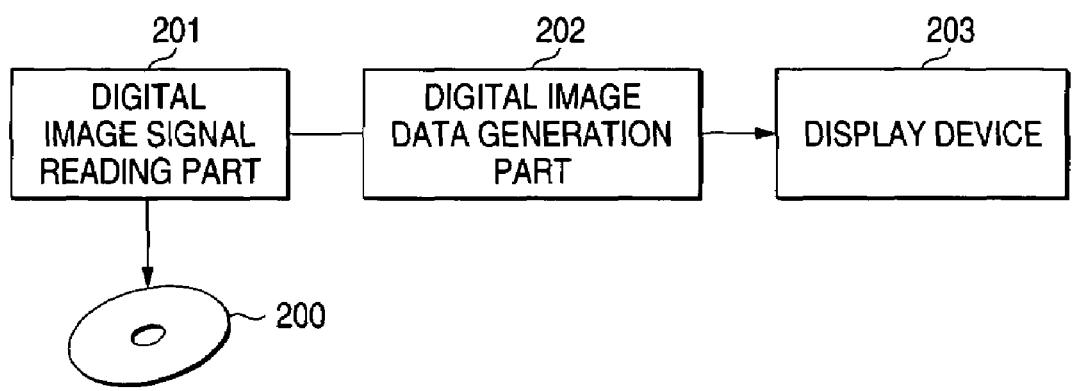
FIG. 1 is a summary block diagram of a DVD player which is a digital image demodulating apparatus according to the invention.

FIG. 1 is a summary block diagram of a DVD player which is a digital image demodulating apparatus of the invention.

Figure 2:
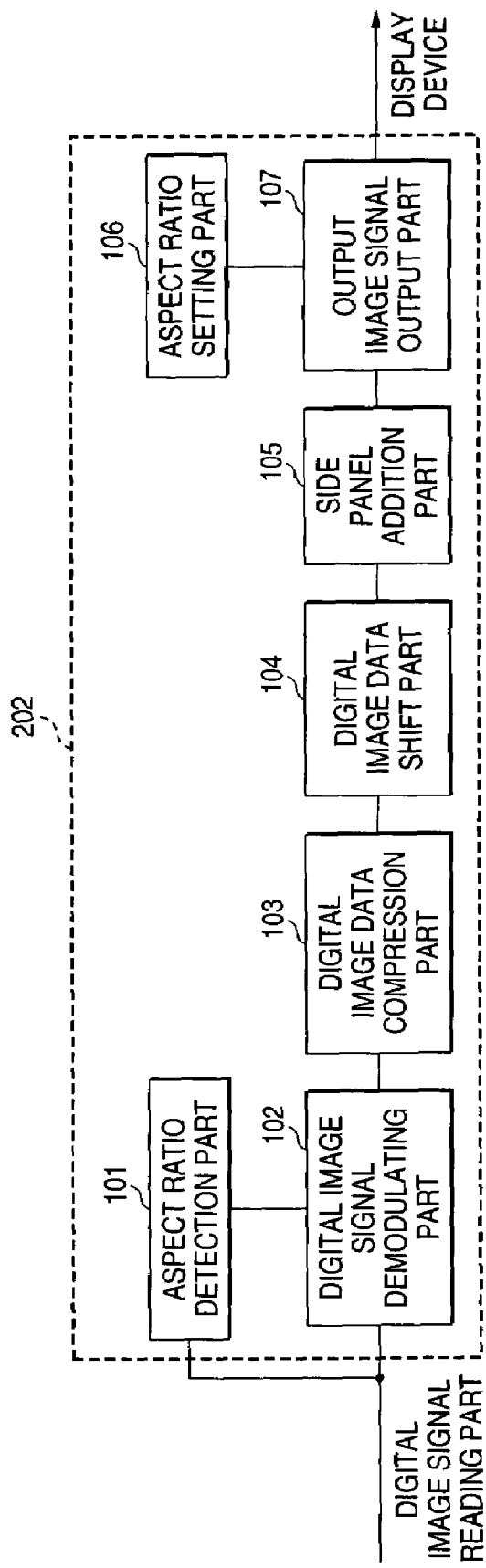
FIG. 2 is a summary block diagram of a digital image signal generation part according to the invention.

FIG. 2 is a block diagram showing an internal configuration of a digital image data generation part 202 shown in FIG. 1.

FIGS. 3A to 3E are summary diagrams showing the processing contents of a digital image signal in each processing step within the digital image data generation part 202 shown in FIG. 2.

As shown in FIG. 1, the DVD player which is the digital image demodulating apparatus of the invention comprises a digital image signal reading part 201 and a digital image data generation part 202, and an output part of the digital image data generation part 202 is connected to a display device 203. A DVD disk 200 which is a storage medium is inserted into this DVD player, and the contents stored on a surface of the DVD disk 200 by a known method are read as a digital image signal by the digital image signal reading part 201. The digital image signal read is sent to the digital image data generation part 202. In the digital image data generation part 202, digital image data is generated based on the digital image signal using a method described below and control processing such as compression of the digital image data, a shift, and addition of side panels is performed and then the digital image data is converted into a predetermined output image signal and is outputted to the display device 203. Then, the display device 203 displays the output image signal on a display screen. Here, it is assumed that an aspect ratio of the display device 203 is 16 to 9.

Next, a configuration of the digital image data generation part 202 of such a DVD player will be described.

As shown in FIG. 2, the digital image data generation part 202 comprises an aspect ratio detection part 101, a digital image signal demodulating part 102, a digital image data compression part 103, a digital image data shift part 104, a side panel addition part 105, an aspect ratio setting part 106, and a digital image output part 107.

The aspect ratio detection part 101 decodes a digital image signal inputted from the DVD disk 200 via the digital image signal reading part 201 of FIG. 1 and extracts only a signal part about an aspect ratio like, for example, CGMS and detects an aspect ratio of a digital image signal inputted to a main body. Here, when the detected aspect ratio is 4 to 3, an action shown in FIGS. 3A to 3E is performed.

Figure 3A:
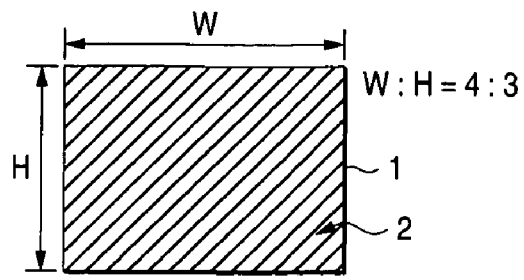
FIGS. 3A to 3E are summary diagrams showing a state of an image signal in each step of a digital signal demodulating apparatus.
Figure 3B:
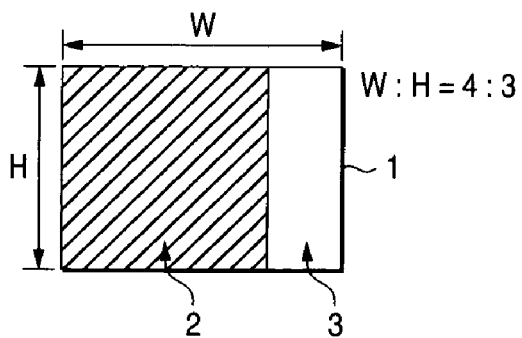

In the digital image signal demodulating part 102, a digital image signal inputted from the DVD disk 200 via the digital image signal reading part 201 of FIG. 1 is decoded and as shown in FIG. 3A, digital image data 2 is created according to an image frame 1 with an aspect ratio of 4 to 3 extracted by the aspect ratio detection part 101. Thus, the digital image data 2 decoded by the aspect ratio of 4 to 3 is compressed in a lateral direction which is a time axis of a horizontal direction in an analog signal in the digital image data compression part 103. By being compressed thus, as shown in FIG. 3B, a presence image part 2 (hereinafter called "a presence image part 2" simply) in which the digital image data is present and an absence image part 3 (hereinafter called "an absence image part 3" simply) in which the digital image data is absent are constructed within the image frame 1 with the aspect ratio of 4 to 3.

Figure 3C:
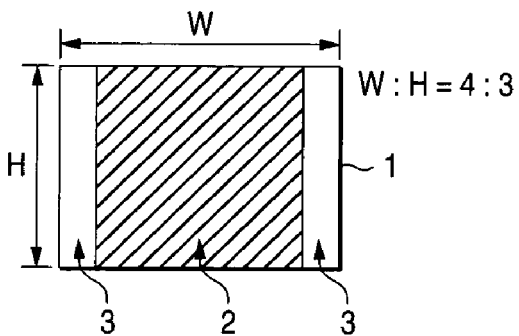

In the digital image data shift part 104, the presence image part 2 compressed by the digital image data compression part 103 is shifted in a lateral direction of the digital image data and is placed in the center position of the image signal frame 1 with the aspect ratio of 4 to 3 as shown in FIG. 3C.

The presence image part 2 formed by compressing and shifting the digital image data thus becomes digital image data with an aspect ratio smaller than the original aspect ratio of 4 to 3.

Figure 3D:
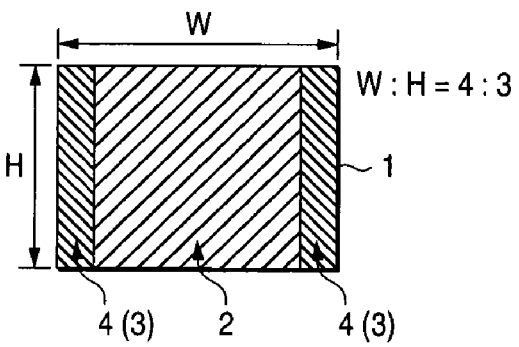

Next, in the side panel addition part 105, as shown in FIG. 3D, side panels 4 are respectively added to both ends of the presence image part 2 and the digital image data with the original aspect ratio of 4 to 3 is constructed. The side panels 4 use the absence image part 3 in which the digital image data is absent as it is.

Figure 3E:
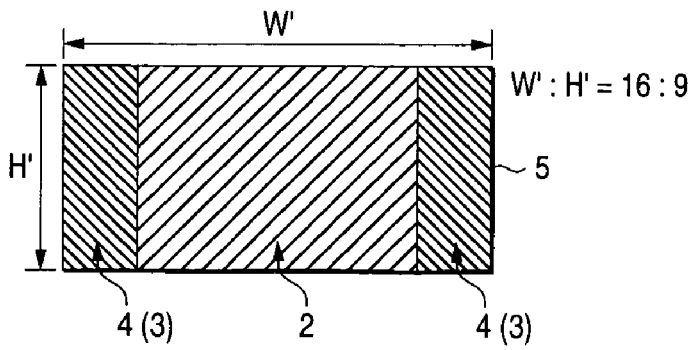
Figure 4A:
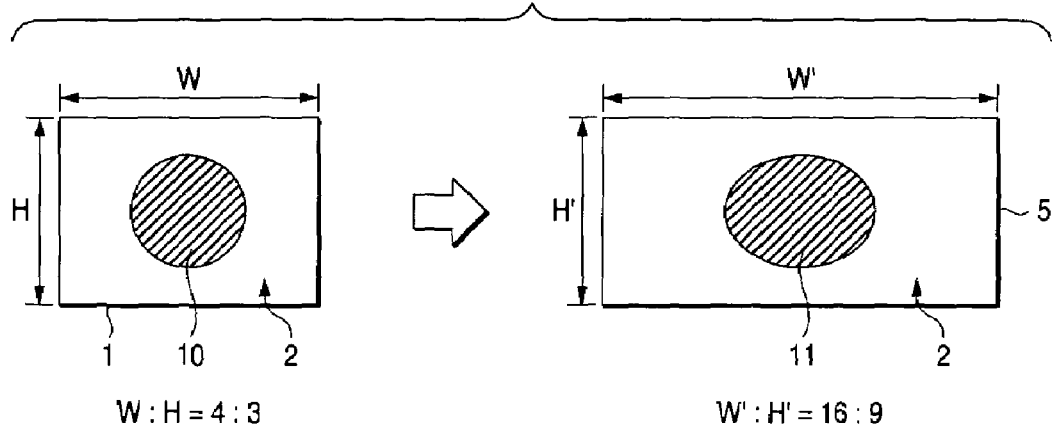
FIGS. 4A and 4B are summary diagrams showing a digital image signal conversion state of a conventional digital signal demodulating apparatus.
Figure 4B:
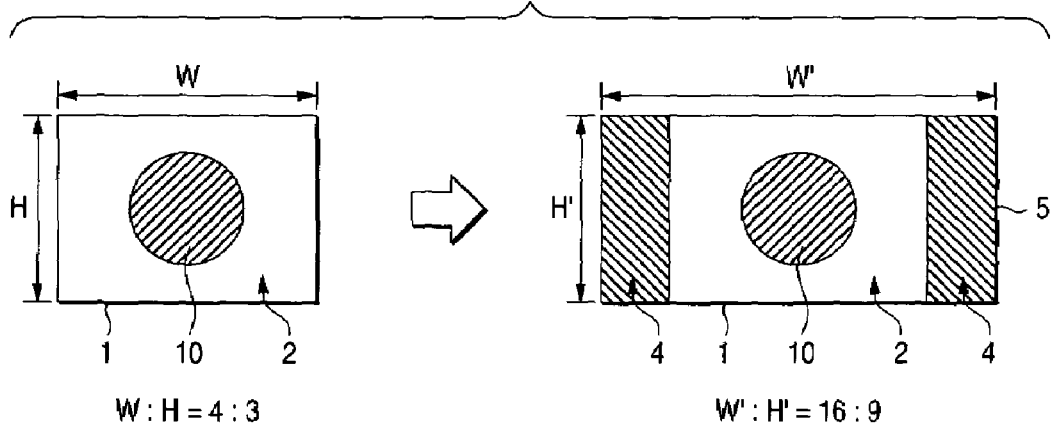

The digital image data with this aspect ratio of 4 to 3 is encoded to a predetermined output image signal by the digital image output part 107 and is outputted to the display device 203 shown in FIG. 1. Here, a signal for setting an aspect ratio of the display device at 16 to 9 is inputted from the aspect ratio setting part 106 and is added to the output image signal. The display device which receives this output image signal obtains a display image expanded laterally uniformly so as to correspond to an image frame 5 with an aspect ratio of 16 to 9 specified by the received output image signal as shown in FIG. 3E.

Here, when a ratio compressed by the digital image data compression part 103 and a ratio expanded by the display device 203 are set at a corresponding ratio, the presence image part 2 of the digital image displayed on the display device 203 becomes the same size as that of the original digital image signal with the aspect ratio of 4 to 3, and lateral expansion in the displayed image can be suppressed.

By forming such construction, a digital image demodulating apparatus capable of suppressing expansion of the image can be constructed even with respect to the display device for laterally uniformly expanding the digital image signal having the aspect ratio of 4 to 3 to the image having the aspect ratio of 16 to 9 forcibly.

Thus, screen display in which lateral expansion of the image is suppressed regardless of performance of the display device can be performed by previously performing control so as to become a predetermined aspect ratio even when the digital image data is laterally expanded within the digital image demodulating apparatus.

Incidentally, in the case that the aspect ratio of the digital image signal inputted to the main body is 16 to 9, processing shown in FIGS. 3A to 3D is not performed and the digital image data constructed by the aspect ratio of 16 to 9 is outputted to the display device. In this case, the digital image data with the aspect ratio of 16 to 9 is inputted to the display device, so that the data is displayed in the image frame with the aspect ratio of 16 to 9 as it is.

Further, in the embodiment, the digital image data is laterally compressed and is shifted in the center position and then the side panels of the absence image part are added, but similar effect can be obtained even when the side panels are added to the decoded digital image data and then the data is laterally compressed and is shifted.

Further, in the embodiment, the case of the DVD player is described, and an object of the invention is to demodulate, compress and shift the inputted digital image signal and add the side panels and form the digital image data constructed by the same aspect ratio as the aspect ratio of the original digital image signal and output the data to the display device with a different aspect ratio. As means having a similar object, there are a PVR for outputting digital image data stored in a magnetic storage medium or an STB for receiving digital broadcast to generate digital image data, etc. and the invention can also be applied to a digital image demodulating apparatus for referring to the digital image data having these aspect ratio information.

Further, in the embodiment, the case that the aspect ratio of the digital image signal is set at 4 to 3 and the aspect ratio of the display device is set at 16 to 9 is described, but the invention can be applied as long as the aspect ratio of the digital image signal differs from the aspect ratio of the display device.

According to the invention, even in the case of a display device for laterally uniformly expanding an image signal forcibly when an aspect ratio of the display device is larger than an aspect ratio of a digital image signal, by converting the amount of this expansion previously and compressing digital image data and adding side panels of an absence image part to both ends of a lateral direction, an image with the same aspect ratio as that of the original digital image signal can be displayed even in the case of being expanded laterally uniformly by the display device. As a result of this, a sharp image without lateral expansion can be displayed.

Further, in the case that an aspect ratio of a digital image signal is 4 to 3 and an aspect ratio of a display device is 16 to 9, by compressing a presence image part of digital image data so that the presence image part becomes a size of an aspect ratio of 4 to 3 after being expanded laterally uniformly by the display device previously, in a manner similar to the case described above, lateral expansion of an image can be suppressed to display a sharp image.

What is claimed is:

1. A digital image demodulating apparatus for demodulating and outputting a digital image signal inputted to a main body, comprising:
   an aspect ratio detector for detecting an aspect ratio of the digital image signal inputted to the main body,
   a digital image data controller, when an aspect ratio of the digital image signal detected by the aspect ratio detector is 4 to 3, at least one of (1) for laterally compressing a digital image based on the digital image signal inputted to the main body and adding side panels of a predetermined size to both sides of the digital image laterally compressed and forming the digital image with a predetermined aspect ratio before the lateral compression, and (2) for performing actions for adding side panels of a predetermined size to both sides of a digital image based on the digital image signal with a predetermined aspect ratio inputted to the main body and laterally compressing this digital image to which the side panels are added and forming the digital image with the predetermined aspect ratio and
   a digital image output unit configured to output the digital image formed by the digital image data controller
   wherein an aspect ratio of the digital image outputted from the digital image output unit is the same as the aspect ratio of the digital image signal inputted to the main body.

2. A digital image demodulating apparatus for demodulating and outputting a digital image signal inputted to a main body, comprising:
   a digital image data controller for laterally compressing a digital image based on the digital image signal with a predetermined aspect ratio inputted to the main body and adding side panels of a predetermined size to both sides of the digital image laterally compressed and forming the digital image with the predetermined aspect ratio before the lateral compression and
   a digital image output unit for outputting the digital image formed by the digital image data controller
   wherein an aspect ratio of the digital image outputted from the digital image output unit is the same as the aspect ratio of the digital image signal inputted to the main body.

3. The digital image demodulating apparatus as defined in claim 2, further comprising:
   an aspect ratio detector for detecting an aspect ratio of a digital image signal inputted to a main body, wherein the digital image data controller acts when an aspect ratio of the digital image signal detected by the aspect ratio detector is the predetermined aspect ratio.

4. The digital image demodulating apparatus as in claim 2, wherein the predetermined aspect ratio is 4 to 3.

5. A digital image demodulating apparatus for demodulating and outputting a digital image signal inputted to a main body, comprising:
   a digital image data controller for adding side panels of a predetermined size to both sides of a digital image based on the digital image signal with a predetermined aspect ratio inputted to the main body and laterally compressing the digital image to which the side panels are added and forming the digital image with the predetermined aspect ratio, and
   a digital image output unit for outputting the digital image formed by the digital image data controller
   wherein an aspect ratio of the digital image outputted from the digital image output unit is the same as the aspect ratio of the digital image signal inputted to the main body.

6. The digital image demodulating apparatus as in claim 5, wherein the predetermined aspect ratio is 4 to 3.

* * * * *